(12) United States Patent
Paterson et al.

(10) Patent No.: US 6,443,238 B1
(45) Date of Patent: Sep. 3, 2002

(54) METHOD OF SECURING MULTIPLE WALLS (75) Inventors: Robert Ian Paterson, London; Brian Alan Breeze, Wallsend, both of (GB)

(73) Assignee: Helifix Limited, London (GB)

( * ) Notice: Subject to any disclaimer, the term of this patent is extended or adjusted under 35 U.S.C. 154(b) by 0 days.

(21) Appl. No.: 10/008,284

(22) Filed: Nov. 5, 2001

Related U.S. Application Data (63) Continuation of application No. 09/149,179, filed on Sep. 8, 1998, now Pat. No. 6,311,785, which is a continuation of application No. 09/105,922, filed on Jun. 27, 1998, now Pat. No. 6,039,125, which is a continuation-in-part of application No. 08/870,708, filed on Jun. 6, 1997, now Pat. No. 5,772,375, which is a division of application No. 08/721,827, filed on Sep. 27, 1996, now Pat. No. 5,687,801, which is a division of application No. 08/491,358, filed on Jun. 30, 1995, now Pat. No. 5,586,605, which is a continuation-in-part of application No. 08/204,465, filed on Feb. 28, 1994, now abandoned.

(51) Int. Cl.[7] ................................................. B25C 5/13
(52) U.S. Cl. ............................. 173/1; 173/4; 173/114; 173/202; 29/456; 29/525.08
(58) Field of Search ........................ 173/1, 114, 202, 173/4; 29/456, 525.08, 525.11; 227/147; 279/145

(56) References Cited

U.S. PATENT DOCUMENTS

| | | | | |
|---|---|---|---|---|
| 2,587,944 A | * | 3/1952 | Williams | 227/147 |
| 3,670,388 A | * | 6/1972 | Jack | 173/4 |
| 4,519,536 A | * | 5/1985 | Steigauf | 227/147 |
| 5,129,118 A | * | 7/1992 | Walmesley | 279/145 |
| 5,687,801 A | * | 11/1997 | Paterson et al. | 173/1 |

OTHER PUBLICATIONS

Helifix®—Stainless Steel Retrofit Wall Tie System—A four (4) page brochure printed and distributed on Jan. 1993.
Blok–Lok® Limited—Stainless Steel Retrofit Wall Tie System—A four (page) brochure publication printed and distributed on Jan. 1993.
Case Decision by the USCAFC—Helifix Ltd. v. Blok–Lok Ltd., 99–1196 –DCT—98–CV–11093—25 pages.
Case Decision by the U.S. District Court of Massachusetts—Helifix Ltd. v. Blok–Lok Ltd., No. 98–11093–REK, 52 USPQ F2d, 1486–1494.

\* cited by examiner

*Primary Examiner*—Scott A. Smith
(74) *Attorney, Agent, or Firm*—Jack E. Dominik (57) ABSTRACT

A cavity wall which is usually made with a hollow concrete block as the inner wythe and brick as the outer wythe is disclosed. A special purpose insertion tool is fitted to a standard hammer tool. A center pin is provided in the insertion tool made with an indent to match the pointed end of the tie. The pin is then pressed into the SDS fitting which is the connection into the drill. The tie end is supported by a short sleeve which, when it contacts the face of the wall, retracts against a spring until the tie driving is completed. A modified embodiment of the adapter recognizes that the tie when activated by the hammer invariably rotates clockwise. Accordingly, if the spring is wound clockwise, the bottom tail end will dig into its seat. On the other hand, if it is wound counterclockwise, it rotates in a "tail skid" relationship to the seat.

11 Claims, 5 Drawing Sheets

METHOD OF SECURING MULTIPLE WALLS

CROSS-REFERENCE TO RELATED APPLICATIONS

This Application is a Continuation of application Ser. No. 09/149,179, filed Sep. 8, 1998, now U.S. Pat. No. 6,311,785, which is a Continuation of application Ser. No. 09/105,922, filed Jun. 27, 1998, now U.S. Pat. No. 6,039,125, issued Mar. 21, 2000, which is a Continuation-In-Part of Ser. No. 08/870,708, filed Jun. 6, 1997, now U.S. Pat. No. 5,772,375, issued Jun. 30, 1998 which is in turn a Divisional of Ser. No. 08/721,827, filed Sep. 27, 1996, now U.S. Pat. No. 5,687,801, issued Nov. 18, 1997, which is in turn a Divisional of Ser. No. 08/491,358, filed Jun. 30, 1995, now U.S. Pat. No. 5,586,605, issued Dec. 24, 1996, which is in turn a Continuation-In-Part of Ser. No. 08/204,465, filed Feb. 28, 1994, now abandoned.

FIELD OF THE INVENTION

The present invention is directed to the subject matter of reinforcing multiple walls usually in a building structure in which a tie is employed to secure two adjacent walls which are parting or otherwise need a tieing arrangement.

BACKGROUND OF THE INVENTION

Often times structures with multiple wythes brick, stone, concrete block, or even timbers are separated partly due to wind loads. The wind loads can be applied in suction or compression. Finally, extra structure loading may be applied in the form of earthquakes, earth shifts, mud slides, and others.

Various techniques have been developed, primarily in the United Kingdom, for a method of inserting and chemically bonding stainless steel helical ties into wood and masonry to enable the repair stabilization of multiple wythe walls normally having cavities between the wythes. Cavities between the adjacent wythes can be very small. Sometimes even zero in a solid wall, which nonetheless requires reinforcing.

In a proper cavity wall, the cavity will usually be one inch or more. Sometimes in the United Kingdom such cavities will be as wide as 5 inches, but normally in the 2 to 4 inch range. In the United States the gap is commonly approximately 1 inch. One such technique is marketed under the trademark RetroTie®. Normally the tie is inserted from the outside wall, and the tie is driven into the inner wall where the tie itself cuts a thread in the substrate due to its rotation while being hammered into the wall. With harder materials such as brick and concrete, a pilot hole is normally drilled from the outside prior to insertion. The drills used for the pilot holes are normally 4.5 mm diameter drills irrespective of whether the tie is 6 or 8 mm in diameter. With certain softer materials such as soft wood, lightweight concrete, and more unusual materials, such as clay, no pilot hole is needed for that thickness.

The tie may be loaded into the insertion tool and a certain length left projecting for concluding the insertion. This length is determined by the needs of the job. Generally softer material requires deeper penetration. When the tie is inserted the amount of tie protruding is driven fully into the inner wythe, that is, the end of the support tool touches the inner wythe. After driving the tie to the required depth in the inner wythe, the outer end is lying in a clearance hole, which is 10 mm for a 6 mm tie, or 12 mm for an 8 mm tie. A plastic sleeve is pushed over the tie and positioned adjacent to the cavity and thereafter bonding takes place by inserting in the outer wythe a bonding agent such as a polyester or epoxy resin. Exemplary of the foregoing are European Patents Nos. 0150906 and 0171250BT.

An alternative to this technique employs reinforcement bars or threaded bars which are chemically bonded into both the inner and the outer wythes. Also, ties are inserted which may use expansion anchoring techniques or anchoring techniques to fix both ends or with expansion at one end and a chemical at the other. Either one or both wythes have the chemical bonding applied.

The anchoring system as described is comparatively expensive, often times too stiff to permit differential movement between the wythes which occurs during the natural expansion of inner and outer wythe due to temperature and moisture variations. On the other hand, ties sold pursuant to the trademark Helifix® described hereinafter have both axial load carrying characteristics and offer lateral flexibility. Moreover, they have a built-in ability to shed water that might attempt to migrate from the outer wythe to the inner wythe.

SUMMARY OF THE PRIOR ART

The patent literature relating to the prior art is found primarily in Class 144, subclass 353, exemplary of which is Canadian Patent No. 457,923 and U.S. Pat. No. 3,144,892. Additional prior patents are German Patent No. 935,023, Netherlands Patent No. 8,903,120, WO 87/01,153, British Patent No. 2,237,319, British Patent No. 12,178,099, British Patent No. 2,250,311, British Patent No. 2,141,773, British Patent No. 2,223,556, and German Patent No. 3,716,808.

Of the above, the Canadian Patent is pertinent in that it shows joining two pieces of timber in a splice. The same is done by a dowel having threads which form an angle of 45° or more to a vertical plane passing through the dowel. The Canadian Patent fails to teach anything with regard to securing brick to brick. Indeed, it should be noted that each of the five independent Canadian claims represents a "wooden structural unit" or "prefabricated wooden construction" to the exclusion of any other type of material. Thus, it is inapplicable to the use of a tie which is in essence a twisted flattened section with a central core and driven through two parallel wythes either brick to brick, mortar to brick, brick to wooden frame, and the like. In U.S. Pat. No. 3,144,892 to Webster, just like the Canadian Patent, each of the independent claims, six in number, refer to a method of fabricating panels, each panel being referenced as "wood panel components". Thus Webster, like the Canadian Patent, fails to even address securing adjacent wythes of brick or other building components to each other in reinforcing engagement in an existing building.

SUMMARY OF THE INVENTION

The invention finds significant utility in a cavity wall which is usually made with a hollow concrete block as the inner wythe and brick as the outer wythe. The cavity is usually ½ to 1 inch and up to 2 inches between the two. The gap may vary from 2 inches to 5 inches or more. The system utilizes a spiral tie which is approximately 7–8 inches or longer. Sometimes the length can be as long as 11 inches, but may be longer or shorter depending upon the materials and the job site. With a 5 to 6 mm pilot hole drilled to the accuracy which can be normally achieved in a brick, the end of the tie will enter the pilot hole quite easily and cleanly. In the two step tie, the diameter is 6 mm and 8 mm, respectively, but may increase or decrease depending upon the application and materials. A special purpose insertion tool is fitted to a standard hammer tool. A center pin is provided in the insertion tool made with an indent to match the pointed end of the tie. The pin is then pressed into the SDS fitting which is the connection into the drill. The tie end is supported by a short sleeve which, when it contacts the face of the wall, retracts against a spring until the tie driving is completed. Usually the pin hammers out a short annular recess below the outer surface of the wall. A modified embodiment of the adapter recognizes that the drill which activates the hammer invariably rotates clockwise. Accordingly, if the spring is wound clockwise, the bottom tail end will dig into its seat. On the other hand, if it is wound counterclockwise, it rotates in a "tail skid" relationship to the seat. During the course of insertion, the pull-out resistance of the tie can be checked by using a pull unit. Normally the pull-out load requires determination one wythe at a time. This is achieved by drilling a clearance hole in the first wythe to measure the load achieved from the second wythe by inserting the tie into one wythe only.

In view of the foregoing, it is a principal object of the present invention to provide a method and apparatus for tieing wythes together which is highly economical both from a cost standpoint of manufacture, and from the standpoint of the labor involved in achieving the fix, and also importantly by the elimination of the cost and hazards of a bonding chemical.

Yet another object of the present invention is to provide a multiple wythe apparatus tie and method in which the speed of insertion is high, namely one minute per tie, thereby providing a wall with 60 ties to be secured in approximately one hour.

An additional object of the present invention results from leaving a hole in the wall face which is small, thus minimizing the marking of the wall face, and permitting a small amount of material to be inserted over the tie to mask and seal and water proof.

Another additional advantage of the subject apparatus and method is to provide excellent holding power along with significant lateral flexibility to accommodate expansion, contraction, wind loads, and even earth tremors.

Finally, but not conclusively, another advantage of the apparatus and method permits application on a year round basis with an instantaneous fix, and eliminating the need for a chemical bond which requires certain climatic conditions in order to cure for a full fix and has health and safety implications in its use. dr

DESCRIPTION OF THE DRAWINGS

Further objects and advantages of the present invention will become apparent as the following description of an illustrative embodiment proceeds, taken in conjunction with the accompanying drawings, in which:

FIGS. 11, 12 and 13 are sequential views of the testing technique which is selectively utilized to determine the holding power of the tie in the inner wythe in which FIG. 11 illustrates the boring of a large hole in the first wythe and a pilot hole in the second wythe; FIG. 12 illustrates the hammering action through a sleeve in which the fix is secured into the second wythe; and FIG. 13 shows the application of a tensionometer secured to the tie to determine the tension required to dislodge the tie from the inner wythe;

DESCRIPTION OF PREFERRED EMBODIMENT

Figure 7:
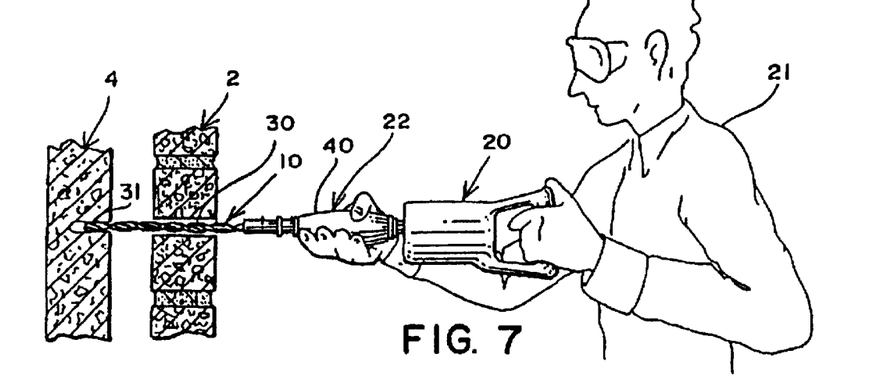
FIG. 7 is an illustrative view of a workman and a hammer drill inserting a tie illustrative of the present invention into a wall having two wythes where the first penetration is mortar and the second penetration is into a solid such as a brick or a concrete block.

Background:

Prior to describing an example of the use of the present method and apparatus, it should be remembered that in tieing two wythes together in a wall it can be done from the outside to the inside, and from the inside to the outside. This is particularly important with historic buildings during total rehabilitation when the interior is gutted and a new interior is installed with a new interior wall or wythe, and then it is desired to tie the same to the original outer wall or wythe. The tie materials used are preferably stainless steel, Austenitic grades 304 or 316. The ties also can be made of other materials, and including tubular rather than solid, although best results have occurred with solid stainless steel materials. The drilling machine 20 employed, such as shown in FIG. 7, is electric, air driven, or hydraulically operated. They employ SDS, SDS+ and SDS Max chucks. All of these are Bosch patented designs. The drilling machine can employ a roto stop feature. Also chiseling machines may be employed without rotary motion so long as the tie is permitted to rotate. The diameter maintained is usually 8 mm. Other sizes are possible for the ties such as 4.5 and 6.0 mm. 10 to 12 mm are both possible for certain high load applications. Also in some instances the number of wythes can be more than two. The only limitation on the number of wythes that can be secured is the strength of the tie and the machine power. Moreover, the wall may be brick/brick, brick/block, block/brick, block/block, brick/wood, block/wood, brick/concrete, and even terracotta type materials.

Figures 1, 2, 3, 4, 5, 6:
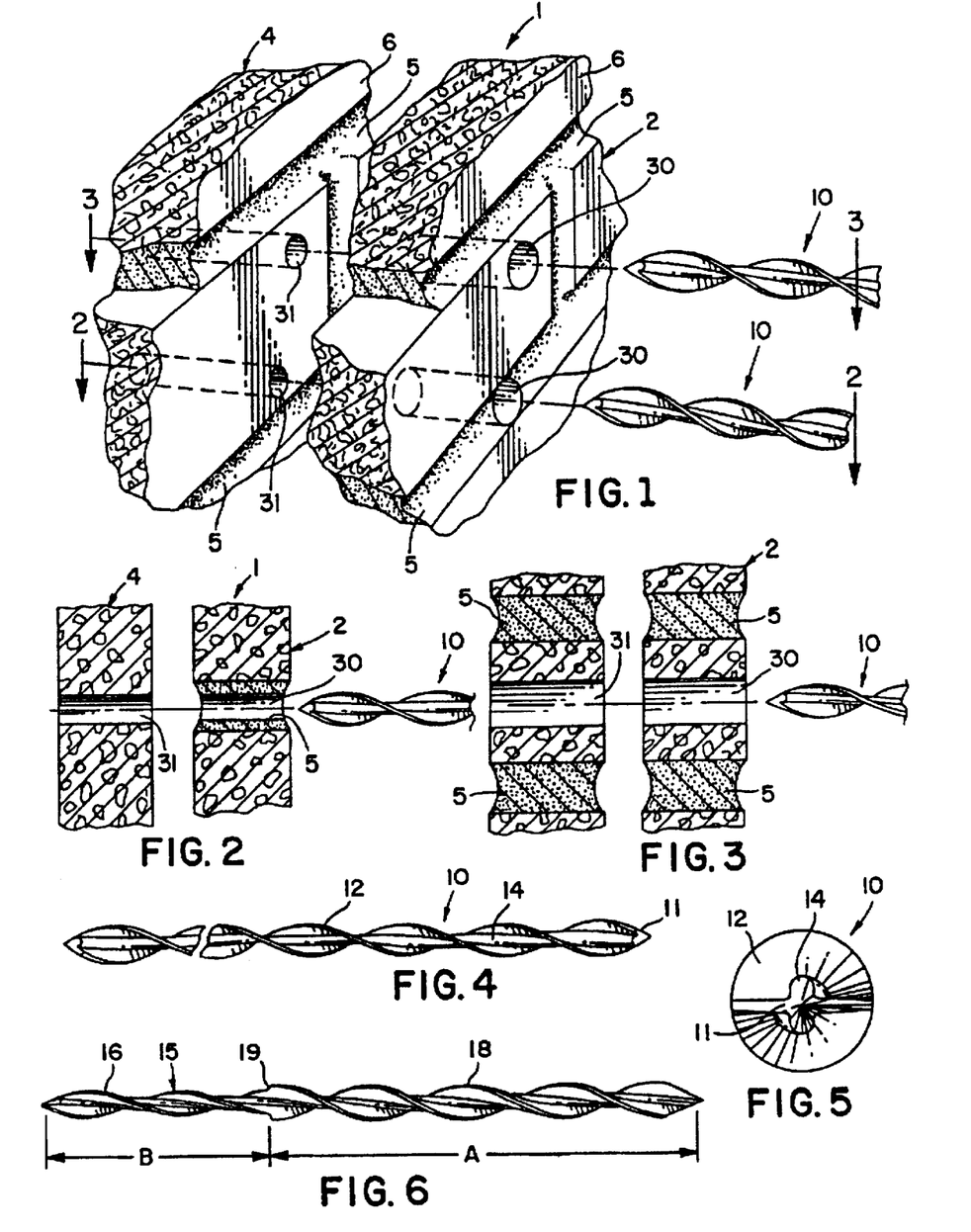
FIG. 1 illustrates diagrammatically a double wythe wall in which one of the ties penetrates the mortar between bricks, and the other tie penetrates the brick body itself.
FIG. 2 is a transverse sectional view taken along section line 2—2 of FIG. 1 showing the relationship of the tie and the two adjacent walls.
FIG. 3 is taken along section line 3—3 of FIG. 1.
FIG. 4 is a front elevation of the exemplary tie utilized in the method.
FIG. 5 is an end view of the tie shown in FIG. 4 and in slightly enlarged scale.
FIG. 6 shows an alternative embodiment tie the pilot end of which is a diameter smaller than the main body portion.

The Method:

With the foregoing background in mind, the method will be reviewed as it addresses a wall 1, such as shown in exemplified form in FIG. 1. There it will be seen that the wall 1 includes an outer wythe 2, an inner wythe 4, and a plurality of structural members 6 joined by mortar. A tie 10 is driven through the outer hole 30 and into the inner hole 31 as will be describe in greater detail hereinafter. In all applications most desirably the tie proceeds brick to brick, or at least mortar to brick. Preferably the inner wythe tie engaging member is solid. Further, the outer an inner holes are desirably at least 1 mm less in diameter than the tie 10.

Referencing now FIG. 2, there it will be seen that the tie 10 is passing through outer hole 30 in the mortar 5 into inner hole 31 in the brick 4 where the inserted tie 10 can be subsequently used to assess the tension. In FIG. 3, the outer hole 30 is employed with a same diameter inner hole 31 in the inner wythe 4 for total penetration by the tie 10. Desirably the outer hole 30 and inner hole 31 are the same diameter whether brick to brick or mortar to brick.

FIG. 4 illustrates the typical tie 10 having a beveled or chiseled end 11, and a plurality of helical wound flutes 12 which surround a core 15. As stated earlier, Austenitic steel of grades 304 or 316 are desirably utilized in forming the ties 10.

A two-step tie is shown in FIG. 6. There it will be seen that the small end 16 of the two step tie 15 is at the left-hand side and the large end 18 at the right-hand side with a step 19 between the two. The various desirable dimensions will be discussed hereinafter.

FIG. 7 illustrates the utilization of a hammer drill 20 held by an operator 21 in which he holds the adapter 22 in his right hand and the hammer drill 20 in his left hand. It will also be appreciated that the drill can be held in the right hand which is often a normal usage. The tie 10 is being passed through the outer wythe 2 and mortar 5 into the inner wythe 4.

After the wall is tied together, the tie 10 thus helically grasps the interior wythe 4 as well as the exterior wythe 2, and a dry fix or tieing relationship is developed. The outer portion of the tie 10 will be buried slightly underneath the outer wythe 2, and the hole left is filled with an adhesive or sealing agent, sometimes mixed with dust from wythe 2 to disguise and seal the hole.

The Adapter:

It is necessary to appreciate that the power source is a hammerdrilling machine 20 fitted with an SDS chuck. The hammer action against the tie 10 causes the tie to rotate as the helical roll penetrates the masonry. It is important that the tie be free to rotate in the nose of the adapter to avoid creating any stress in the masonry other than that imparted by the hammering action of the tie. The tie, in turn, will always follow a "natural" path which is the usual path of least resistance. The stroke of the hammer action is around 10 mm.

For the present application use is made only of the hammer action. Some drilling machines have a feature called "roto stop" which can be selected and cuts out the rotary drive to the chuck leaving only the hammer action. Electric or pneumatic chisel machines normally have the hammer action only.

As most drilling machines commonly found on site do not have the roto stop feature, the present adapter 22 has to be such as to permit its use both with a machine with rotary hammer action as well as one with hammer only.

Figure 8:
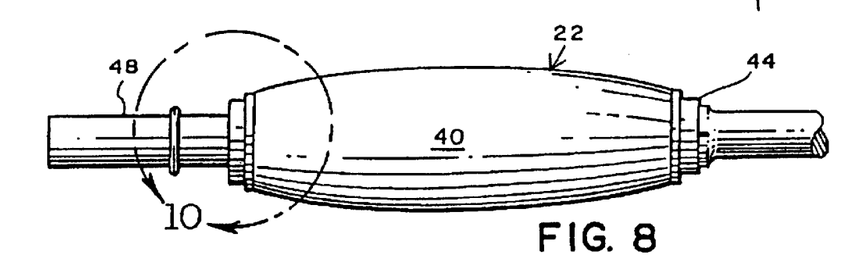
FIG. 8 is a partially diagrammatic view of the hammer drill attachment which produces a unique action in the hammering process enhancing the method of inserting the ties.
Figure 9:
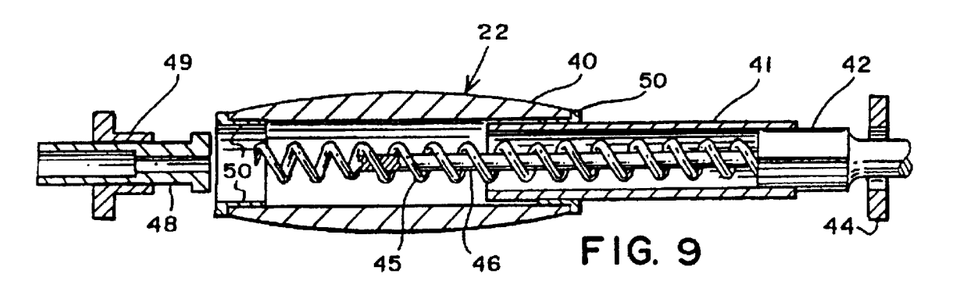
FIG. 9 is an exploded view of the adapter shown in FIG. 8.
Figure 10:
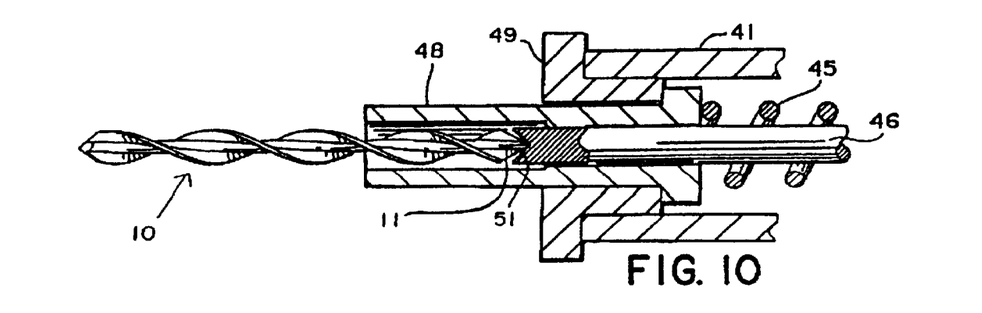
FIG. 10 is an enlarged view of the area shown in phantom lines by circle 10 in FIG. 8 and illustrating the rotational and non-rotational motion of the critical parts while being hammered.

The spring 45 and spring loaded sleeve 48 have any rotational movement imparted by friction only. When the nose of the spring loaded sleeve 48 hits the wall, the stainless steel flutes 12 in the tie 10 are continually driven into the wall, the spring 45 is compressed until the end of the sleeve 48 is flush with the front end screw 49. The drawing shows the tool set up so that the driving pin 46 will project beyond the end of the sleeve 48 and will drive the tie 10 under the surface of the outer wythe 2 face. The drive pin 46 may be set to finish or set the tie 10 set flush. The flush setting is usually only used when the tie 10 is being driven into wood. The outer handle 40 is fitted with a metal bearing 50 at each end. This is usually held by the operator 21 and all the action goes on freely inside it, both rotational and to-and-fro. The tie 10 is driven by the cupped end 51 of the drive pin 46.

Figures 14, 15:
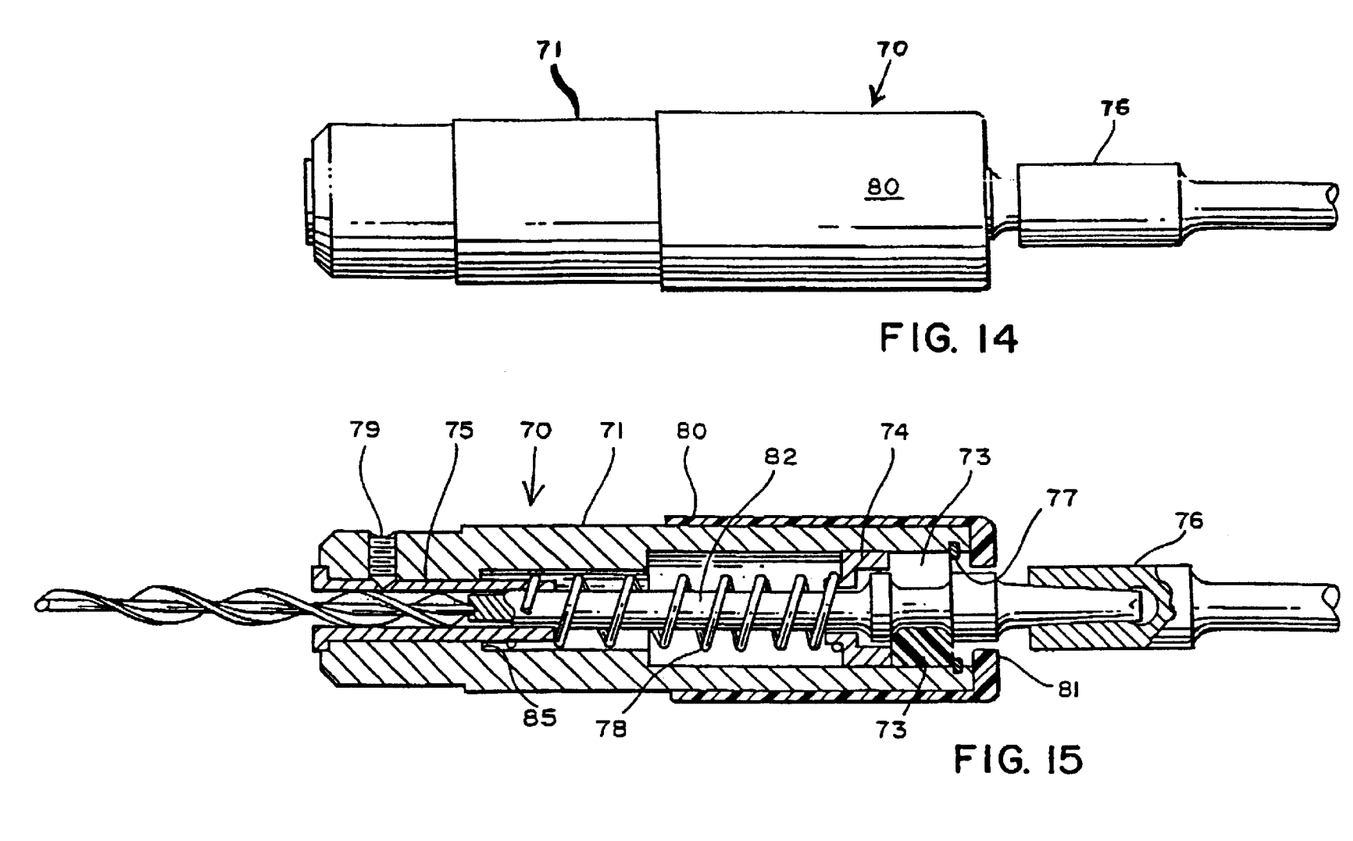
FIG. 14 is a view of the modified adapter approximately the same size and section as that shown in FIG. 9 of the original adapter.
FIG. 15 is a view similar to FIG. 10 but also illustrating the modified adapter.
Figure 16:
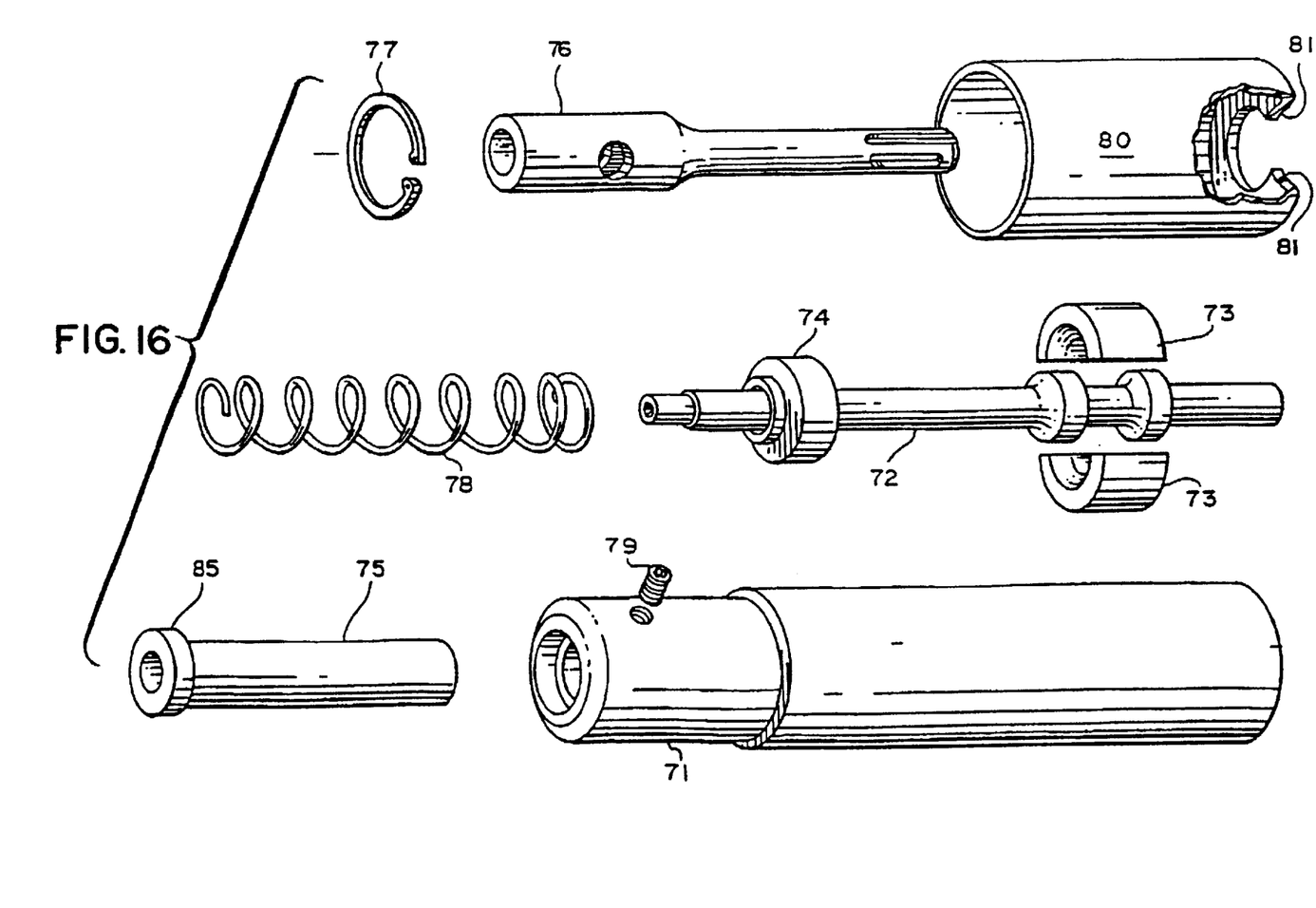
FIG. 16 is an exploded perspective view of the modifier adapter.

The Modified Adapter:

The modified adapter 70 is best illustrated in FIGS. 14–16. Here it should be remembered that the drill which activates the hammer and the hammer SDS chuck will rotate clockwise. Thus, as the rotation driven by the tie 10 creeps in a clockwise direction, the coil spring 78 compresses and drives the spring loaded spring ends rotatably clockwise or right-handed. With the modified adapter 70, it will be seen that it utilizes an outer body 71 which runs substantially the entire length of the modified adapter 70. A drive pin 72 is positioned centrally of the body 71. The drive pin 72 engages a split bearing 73 which is seated within the outer body 71. A spring seating washer 74 is held against the split bearing 73 by the spring 78. A front sleeve 75 is secured interiorly of the forward portion of the outer body 71. A tapered SDS adapter 76 is seated upon the driven end of the drive pin 72. The split bearing 73 is sandwiched in place against the spring seating washer 74 by means of the snap ring 77. The activity is applied by means of the coil spring 78 which is left-hand or counterclockwise wound rather than right-hand of clockwise wound. This is done to cause the remote end of the spring 78 to engage the spring seating Washer 74 in a "tail skid" relationship. This action is similarly involved with the opposite end of the spring 78. The front sleeve 75 is secured in place interiorly of the outer body 71 by means of set screw 79. The outer body 71 is covered at its portion closest to the SDS adapter 76 by a plastic over sleeve 80 which is in close fitting engagement to the outer body 71, and extends throughout about half of the length of the outer barrel 71. A centrally disposed collar 81 is located at the remote end of the plastic cover sleeve 80. To be noted specifically is that the spring 78 seats at the split bearing 73 end in the spring seating washer 74 and is secured therein by means of the collar 83. At the opposite end, an annular space 84 terminating in a shoulder 85 is defined between the inner portion of the front sleeve 75 and the inner portion of the outer body 71.

The 2 Diameter Tie:

Normally a suitable pilot drill is driven through consecutive wythes and the helical tie 10 is driven home. Where the materials of the different wythes are similar or, at least, are of similar strength, this works fine.

Where the outer wythe 2 is harder/stronger than the inner wythe 4 materials then, on occasions, it may be necessary to drill a first hole right through which is correct for the softer/weaker materials and then use a slightly larger pilot in the harder material only.

The problem comes where the outer material is soft, requiring the smaller hole, and the inner material is hard, requiring a larger hole. The example which demands this new technique occurs where there is a requirement to fix through the mortar joint in the outer wythe and fix into reinforced concrete or brick. With the two diameter tie 15 of FIG. 6 one can use a single drill through the mortar and into the concrete or brick. The small end 16 is then driven into the hard material and the large end 18 will still get a good grip in the softer, outer wythe mortar. The two step tie 15 proves useful, not just in the mortar bed to concrete application above, but in any application where one wants to fix soft/weak to hard/strong. The division between the small end 16 and large end 18 forms a step 19 in the two step tie 15. The small end 16 is normally but not necessarily the shorter end, about one third the length of the two step tie 15.

Figure 13:
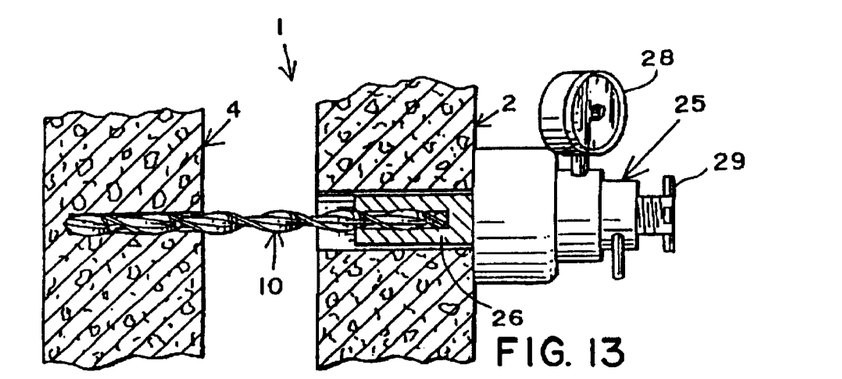

Load Test Unit:

The load test unit or tensionometer 25 uses a small hydraulic cell which has pressure applied to it by a jacking screw or actuator 29. The pressure is measured by the gauge 28 which is calibrated to give a direct reading of force applied when engaged to a tie 10 by the load test key 26.

The load test key 26 fits over the end of the tie imparting no torsional load and only an end load. The cross piece of the key fits into the end of the central shaft and an axial load is applied by turning the jacking nut or actuator 29.

Figure 11:
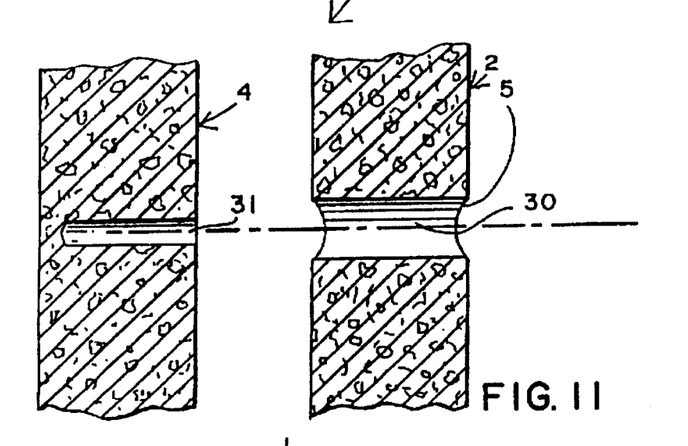
Figure 12:
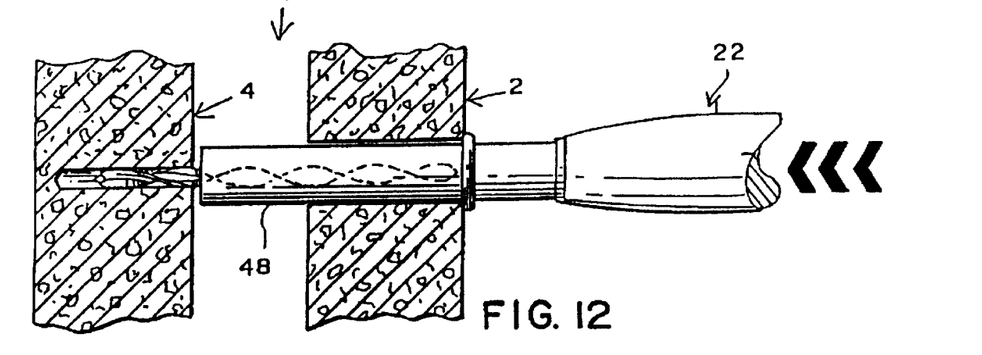

With the illustrated system it is not possible to test the tie in its final fixed state. The strength of the inner wythe is determined by making a clearance hole in the outer and driving the tie into the inner wythe or by using a core drill to create a clearance hole around the end of the tie in the outer wythe after insertion. The load test unit 25 is applied and the strength is determined. This is repeated at several locations around the building and usually the weakest load obtained is used for the design of the fixing pattern.

Similarly the outer wythe 2 is tested by driving a tie 10 through the outer wythe 2 only—not into the inner 4—and applying the load test unit 25 to measure the strength.

Although particular embodiments of the invention have been shown and described in full here, there is no intention to thereby limit the invention to the details of such embodiments. On the contrary, the intention is to cover all modifications, alternatives, embodiments, usages and equivalents as fall within the spirit and scope of the present invention, specification and appended claims.

What is claimed is:

1. A method of securing two or more wythes in a building structure utilizing a helical tie member having longitudinal helical flutes terminating at a cutting end at one end and terminating at a remote end opposite the cutting end comprising the steps of:

drilling a first wythe pilot hole to a diameter less than a diameter of the flutes on the tie to be inserted;

drilling a pilot hole in a second wythe to a predetermined depth;

proportioning said tie to a diametrical range between 4 and 12 millimeters;

forming said tie out of austenitic steel of grades 304 or 316 stainless steel and limiting the longitudinal dimension of such ties to the range of 6 to 12 inches;

forming a chiseled end on at least one end of said tie;

inserting the remote end of the tie into a reciprocating power driven tool which has a rod which engages and impactingly drives the tie with a hammer like impact in the absence of any driven torque and permits the tie to rotate while confined around its longitudinal axis as a helical bed is developed in the first wythe due to the torque free impact penetration by the tie;

passing the flutes into the second wythe and continuing to impactingly drive the tie to a base of the pilot hole;

removing the driving tool from the remote end of the tie; and thereafter finishing the remote end of the tie in accordance with mandates of the site.

2. In the method according to claim 1, the further step of:

impactingly driving the tie with power driven SDS drilling machine and a spring biased adapter connected to said SDS machine which retracts the rod between the blows of the SDS machine and the contact with the impacted end of the tie.

3. In the method according to claim 1, the further step of:

impactingly driving the rod engaging the end of the tie opposite the cutting end with a tool having a spring biasing reciprocating member having two ends, one end engaging the tie in a repetitive hammer like impact and the other end of said reciprocating member engaging a power hammer for repeatedly delivering a blow to each reciprocating member in a torqueless engagement thereby permitting the tie to rotate in the absence of applying a torque as it cuts its helical bed and in which the reciprocating member is urged to retract after each blow by the spring.

4. In the method according to claim 1, the further step of:

engaging the tie through a spring biased floating drive element in the adapter so that the tie may freely rotate during the time of impacting unrestricted by the hammer like impact of the impacting member of the adapter.

5. A method of securing two or more wythes in a building structure utilizing a helical tie member having longitudinal helical flutes terminating at a cutting end at one end and terminating at a remote end opposite the cutting end comprising the steps of:

drilling a first wythe pilot hole to a diameter less than a diameter of the flutes on the tie to be inserted;

drilling a pilot hole in a second wythe to a predetermined depth;

proportioning said helical tie to at least a 4:1 ratio of the length of tie required for one complete revolution of the helix to the diameter of the helical tie;

inserting the remote end of the tie into a reciprocating power driven tool which has a rod which engages and impactingly drives the tie with a hammer like impact in the absence of any driven torque and permits the tie to rotate while confined around its longitudinal axis as a helical bed is developed in the first wythe due to the torque free impact penetration by the tie;

passing the flutes into the second wythe and continuing to impactingly drive the tie to a base of the pilot hole;

removing the driving tool from the remote end of the tie; and thereafter finishing the remote end of the tie in accordance with mandates of the site.

6. In the method according to claim 5, the further step of:

impactingly driving the rod engaging the end of the tie opposite the cutting end with a tool having a spring biasing reciprocating member having two ends, one end engaging the tie in a repetitive hammer like impact and the other end of said reciprocating member engaging a power hammer for repeatedly delivering a blow to each reciprocating member in a torqueless engagement thereby permitting the tie to rotate in the absence of applying a torque as it cuts its helical bed and in which the reciprocating member is urged to retract after each blow by the spring.

7. In the method according to claim 5, the further step of:

engaging the tie through a spring biased floating drive element in the adapter so that the tie may freely rotate during the time of impacting unrestricted by the hammer like impact of the impacting member of the adapter.

8. A method of securing two or more wythes, the first wythe of which has an outer and an inner face, in a building structure utilizing a helical tie member having longitudinal helical flutes terminating at a cutting end at one end and terminating at a remote end opposite the cutting end where the tie is impacted and in which a power driven tool for impactingly driving is selected from the types which have a hammer with a chuck removably secured to an adapter, which adapter contains a spring means between the hammer and the tie, said adapter and power drilling machine engaging the tie through a non rotating hammer like floating drive with a drive pin in the adapter so that the tie may freely rotate during the time of impacting unrestricted by the rotating, if any, of the drive pin impacting member of the adapter, comprising the steps of:

drilling a first wythe hole to a diameter less than a diameter of the flutes on the tie to be inserted which diameter shall be at least 1 mm less than the diameter of the tie;

thereafter drilling a pilot hole in the second wythe to a predetermined depth base which will permit the tie when totally passed through both wythes to be inserted slightly beneath the face of the first wythe;

positioning a sleeve in the adapter to surround the driving pin where the pin engages the tie;

proportioning said helical tie to at least a 4:1 ratio of the length of tie required for one complete revolution of the helix to the diameter of the helical tie;

inserting the remote end of the tie into said adapter for the power driven tool which impactingly drives the tie and permits the tie to rotate confined around its longitudinal axis as a helical bed is developed in the first wythe due to the penetration by the tie;

positioning said adapter with a yieldable means between the impacting power driven tool and the portion of the tool which engages the tie to thereby bias the tie and urge the tie hammer away from the tie after each hammer blow is struck on the tie; and     passing the flutes into the second wythe and continuing to impactingly drive the tie to the base of the second wythe pilot hole.

9. In the method according to claim 8, impactingly driving the tie by engaging the end of the tie opposite the cutting end with a tool having a spring biasing reciprocating member having two ends, one end engaging the tie in a repetitive hammer like impact and the other end of said reciprocating member engaging a power hammer for repeatedly delivering a blow to reciprocating members in a torqueless engagement thereby permitting the tie to rotate in the absence of applying a torque as it cuts its helical bed and in which the reciprocating member is urged to retract after each blow by the spring.

10. A method of securing two or more wythes in a building structure, the first wythe of which has an outer and an inner face utilizing a helical tie member having longitudinal helical flutes terminating at a cutting end at one end and terminating at a remote end opposite the cutting end where the tie is impacted and in which a power driven tool for impactingly driving is selected from the types which have a hammer action of a power drilling machine with a chuck removably secured to an adapter, which adapter contains yieldable means between the hammer blow and the tie, said adapter and power drilling machine engaging the tie through a torqueless floating drive in the adapter so that the tie may freely rotate during the time of impacting unrestricted by the rotating, if any, of the impacting member of the adapter, comprising the steps of:

drilling a first wythe with a drill hole to a diameter less than a diameter of the flutes on the tie to be inserted which diameter shall be at least 1 mm less than the diameter of the tie;

thereafter drilling a pilot drill hole in the second wythe to a predetermined depth which will permit the tie when totally passed through both wythes to be inserted slightly beneath the face of the first wythe;

proportioning said tie to a diametrical range between 4 and 12 millimeters;

forming said tie out of austenitic steel of grades 304 or 316 stainless steel and limiting the longitudinal dimension of such ties to the range of 6 to 12 inches;

forming a chiseled end on at least one end of said tie;

inserting the remote end of the tie into said adapter for the power driven tool which impactingly drives the tie with a hammer like repetitive engagement without applying any torque to the tie and permitting the tie to rotate confined around its longitudinal axis for alignment into the drill holes as a helical bed is developed in the first wythe due to the penetration by the tie;

positioning said adapter and its yieldable means between the impacting power driven tool and the portion of the tool which engages the tie to thereby bias the tie and cushion the impact of the power driven tool;

passing the flutes into the second wythe and continuing to impactingly drive the tie to a base of the second wythe pilot hole.

11. In the method according to claim 10, the further step of:

impactingly driving the rod engaging the end of the tie opposite the cutting end with a tool having a spring biasing reciprocating member having two ends, one end engaging the tie in a repetitive hammer like impact and the other end of said reciprocating member engaging a power hammer for repeatedly delivering a blow to each reciprocating member in a torqueless engagement thereby permitting the tie to rotate in the absence of applying a torque as it cuts its helical bed and in which the reciprocating member is urged to retract after each blow by the spring.

\* \* \* \* \*